United States Patent [19]

Van Ginkel et al.

[11] Patent Number: 5,965,024
[45] Date of Patent: Oct. 12, 1999

[54] MICROBIOLOGICAL DEGRADATION OF ALKYLENE AMINE ACETATES

[75] Inventors: Cornelis Gijsbertus Van Ginkel, Wageningen; Eltjo Boelema, Bathmen, both of Netherlands

[73] Assignee: Akzo Nobel N.V., Netherlands

[21] Appl. No.: 08/983,025

[22] PCT Filed: Jun. 13, 1996

[86] PCT No.: PCT/EP96/02584

§ 371 Date: Dec. 22, 1997

§ 102(e) Date: Dec. 22, 1997

[87] PCT Pub. No.: WO97/02217

PCT Pub. Date: Jan. 23, 1997

[30] Foreign Application Priority Data

Jul. 6, 1995 [NL] Netherlands .......................... 1000736

[51] Int. Cl.$^6$ .................................................. C02F 3/00
[52] U.S. Cl. .................. 210/601; 210/620; 210/908; 210/910; 435/262.5
[58] Field of Search ................... 210/610, 611, 210/614, 620, 626, 631, 908–910, 601; 435/262, 262.5

[56] References Cited

U.S. PATENT DOCUMENTS

| | | |
|---|---|---|
| 5,100,800 | 3/1992 | Kulpa et al. . |
| 5,169,532 | 12/1992 | Whitlock . |
| 5,252,483 | 10/1993 | Lauff et al. . |
| 5,296,111 | 3/1994 | Suzuki et al. . |

FOREIGN PATENT DOCUMENTS

| | | |
|---|---|---|
| 0 516 102 | 12/1992 | European Pat. Off. . |
| 58-043782 | 3/1983 | Japan . |
| WO94/26691 | 11/1994 | WIPO . |

OTHER PUBLICATIONS

*Abstract,* JP06296990, dated Oct. 25, 1994.
*Abstract,* JP58043782, dated Mar. 14, 1983.
*Abstract,* JP 06335384, dated Dec. 6, 1994.
*Abstract,* SU1275008, dated Dec. 7, 1986.
*Abstract,* SU1784591, dated Dec. 30, 1992.
*Applied and Environmental Microbiology,* B. Nortemann, "Total Degradation of EDTA by Mixed Cultures and A Bacterial Isolate", Feb. 1992, p. 671–676, vol. 58, No. 2.
*Water Environmental Research,* S.G. Pavlostathis and Morrison, "Aerobic biodegradaiton potential of photoprocessing wastewaters", (1994), 211–219, vol. 66, No. 3.
*Tappi Journal,* Reiio Saunamaki, "Treatability of wastewaters from totally chlorine–free bleaching", vol. 78, No. 8, (1995), pp. 185–192.
*Publikatieblad van de Europese Gemeenschappen,* "Biologische Afbraak", dated May 30, 1988., No. L 133/123–127.
*International Search Report,* date Oct. 10, 1996.
Nikolaus Gschwind, "Biodegradation of EDTA in a model waste water", pp. 1–7 (translation of German article GWF Gas–Wasserfach: Wasser/Abwasser vol. 133, 10 (1992) 546–549.

*Primary Examiner*—Jay H. Woo
*Assistant Examiner*—Fred Prince
*Attorney, Agent, or Firm*—Ralph J. Mancini; Richard Fennelly

[57] ABSTRACT

The microbiological degradation of alkylene amine acetates under alkaline conditions using microorganisms present in activated sludge is achieved by contacting the alkylene amine acetate-containing waste, at a pH of about 9 or less, with activated sludge containing a wide range of microorganisms, in the absence of carrier materials.

8 Claims, No Drawings

MICROBIOLOGICAL DEGRADATION OF ALKYLENE AMINE ACETATES

The invention pertains to a process for the microbiological degradation of alkylene amine acetates under alkaline conditions, using microorganisms present in activated sludge.

Such a process is known from an article by N. Gschwind in *GWF Gas-Wasserfach: Wasser/Abwasser* Vol. 133, 10 (1992), 546–549, which describes how ethylene diamine tetraacetate (EDTA) can be degraded in a model system in a continuous reactor. EDTA-containing water was treated with immobilised microorganisms from industrial treatment plant activated sludge enriched to that end on a special carrier material (foam polyurethane PUR REA 90/18, fine).

There are several drawbacks to the process described by Gschwind. For instance, it was found that effective degradation of EDTA is only achieved at a pH of 9–9.5. In actual practice, however, it is preferred to employ a more neutral pH in waste water treatment plants in order not to cause an adverse effect on the various reactions taking place with the aid of the other microorganisms present. Moreover, surface water managers prefer the discharge of a pH neutral effluent from water treatment plants. In Gschwind's experiment, at a pH of 8.5 the degradation of EDTA is sharply reduced over time. According to Gschwind, a pH of less than 9 really is not feasible. There is also the fact that the use of carrier materials as applied by Gschwind is objectionable because the amount of solid waste formed, which needs to be treated as chemical waste, may well be increased. Moreover, it is not possible to use carrier materials just like that in "conventional," activated sludge based water treatment plants. Gschwind reports that cultures not attached to carriers proved unsuccessful. Besides, it is not clear from the article that EDTA degradation continues to be effective in effluent which contains other carbon sources in addition to the EDTA.

It has now been found that waste water which contains alkylene amine acetates and, optionally, other contaminants can be effectively purified at a pH of about 8–9 by making use of microorganisms in flocs, without the need to employ a special carrier material for the microorganisms. It was found that in this process not only EDTA but also other alkylene amine acetates, for instance propylene diamine tetraacetate (PDTA), were microbiologically degradable.

The process disclosed in the opening paragraph is characterised in that alkylene amine acetate-containing waste is contacted, at a pH of about 9 or less, with activated sludge containing a wide range of microorganisms, in the absence of specific carrier materials.

It should be noted that Japanese prepublished patent applications JP-A-6296990 and JP-A-6335384 disclose the use on a carrier material of special bacteria of the *Pseudomonas editabidus*-1 type, which bacteria, when fixed on a carrier, are capable of degrading EDTA. However, the use of activated sludge containing a wide range of microorganisms at a specific pH is neither mentioned nor suggested.

Further, B. Nörtemann in *Applied and Environmental Microbiology* 58 (1992), 671–676 discloses that, in general, EDTA has poor biodegradability, but that 98% degradation of EDTA in model systems can be achieved by immobilising bacteria on sand. Preference is given in this process to the use of a mixed culture of microorganisms because of the synergism occurring among the different bacteria. The importance of maintaining a specific pH is neither disclosed nor suggested. Also, the enrichment of microorganisms with a complex, EDTA-containing medium was again found to be impossible. Only with glyoxalate, glycine or ethylene diamine present as a carbon source in addition to EDTA was inhibition not observed.

Pre-published patent application JP-A-58043782 discloses how EDTA is degraded in a closed bottle test using specific Pseudonomas and Alcaligenes bacteria. Said special testing method employs pure cultures of these bacteria, this to solve the problem of unsatisfactory EDTA degradation in, say, activated sludge plants using the wide range of bacteria present in the sludge.

Besides, a recent article by S. G. Pavlostathis et al. in *Water Environment Research* 66 (1994), 211 teaches that traditional waste water treatment plants in particular are not too effective when it comes to removing EDTA from effluent. This was recently confirmed in an article by R. Saunamäki in *Tappi Journal* 78, No. 8 (1995), 185–192.

So far, the microbiological degradation of alkylene amine acetates has been shown only in model experiments, using conditions which are neither common nor attractive in actual practice. Despite the favourable process/performance ratio of, say, EDTA and PDTA, a tendency can even be noted to develop new alternatives which often perform less successfully, because alkylene amine acetates are assumed not to be biodegradable. See, e.g., published patent applications EP-A-0516102 and WO 94/26691.

The microbiological degradation of alkylene amine acetates according to the invention takes place at the usual water treatment plant process temperatures and is dependent, int. al., on the ambient temperature and the temperature of the influent. Preferably, a temperature in the range of 10° to 38° C. is maintained.

The pH of the reaction mixture preferably is continuously kept at a value of 7 to 9, more particularly at about 8.5, during its stay in the reactor. This can be achieved by the intermittent addition or not of sufficient amounts of acid, base and/or salts.

To achieve efficient microbiological degradation of alkylene amine acetates, preferably care will be taken to ensure that the effluent always contains one or more of these compounds and the activated sludge employed stays in the water treatment plant for a sufficiently long period of time. In view of the lag period of one to several weeks before there is efficient conversion of, say, EDTA by the activated sludge, a sludge retention time of at least one week is preferred. In the case of PDTA the lag period tends to be substantial, increasing to about two months, and a sludge retention time of more than two months is preferred. In order to ensure efficient biodegradation in those cases where the activated sludge retention time is shorter than the lag period, or the alkylene amine acetate supply is very irregular, suitable microorganisms can be introduced into the treatment plant before or at the moment the alkylene amine acetate-containing waste stream is supplied to the plant. To this end a quantity of sludge from a previous alkylene amine acetate degradation period can be suitably used. Alternatively, an individually enriched and/or grown culture of alkylene amine acetate converting microorganisms can be used in the activated sludge. The microorganisms in that case may have been enriched and/or grown using a different alkylene amine acetate from the one needing to be degraded. An example of a concentration range for efficient degradation of alkylene amine acetate is 1–600 mg/l influent, more particularly 2–300 mg/l influent, preferably 5–200 mg/l influent.

It should be noted that the term "alkylene amine acetates" refers not only to the aforementioned EDTA and PDTA, but also to compounds such as N,N-bis[2-(bis (carboxymethyl)amino)ethyl]-glycine, also known as pentetic acid. In all cases the alkylene amine acetate may be present in the acidic form or in the form of a complex with a metal ion.

The following, unlimitative examples serve to illustrate the invention. These examples show how EDTA and PDTA found in effluent can be degraded in activated sludge based waste water treatment plants. However, it is equally possible to practice the invention in plants operated on the same or a similar principle, variants which will be obvious to the skilled person. If so desired, these variants can employ activated sludge or effluent from other sources than the ones mentioned here. The addition of phosphates, nitrogen derivatives, or other compounds to the waste water, as is standard procedure in water treatment plants with a less than optimum influent, can also be practiced in a water treatment plant in which an alkylene amine acetate is degraded according to the invention.

EXPERIMENTAL SECTION

The biodegradation experiments were performed in so-called Semi-Continuous Activated Sludge (SCAS) reactors, which closely imitate commercial waste water treatment plants (WTP). The procedure was in accordance with OECD guideline section 3: "Degradation and accumulation No 302, An Inherent biodegradability; modified SCAS test (1981) Paris Cedex France." This testing method has also been published in the *Publikatieblad van de Europese Gemeenschappen* of May 30, 1988 under No. L 133/123–127.

The same testing method, Section C, entitled "Methods for the determination of ecotoxicity. Biodegradation Activated sludge simulation tests," discloses a Continuous Activated Sludge (CAS) test which corresponds to the test in accordance with OECD/EC guideline section 3: "Degradation and accumulation No 303 A (1981) Paris Cedex France." This testing method was used to evaluate the microbiological degradation of EDTA in a paper mill effluent stream.

In a SCAS test samples of activated sludge having a solids content of about 2 g/l were tested in aeration chambers of about 150 ml. The test cycle was repeated six times a week. The stock solution of the compound to be tested contained 2 g/l EDTA or PDTA. In the CAS test the reactor was filled with activated sludge, after which there was such aeration as to give a dissolved oxygen concentration of more than 2 mg/l. Waste water was supplied in a quantity of 0.20 l/day. The reactor employed had an aeration chamber of 0.40 l and a settling chamber of 0.06 l from which 20 ml of sludge was extracted daily, so that the waste water had a residence time of 48 hours and the sludge had a retention time of 20 days. To determine the biodegradation of substances in the waste water, treated water was collected over 24-hour periods, after which this sample was analysed and compared with the waste water flowing in.

In a number of cases the waste water employed originated from the municipal WTP Nieuwgraaf in Duiven, the WTP of a dairy or paper factory, or Akzo Nobel's WTP Deventer or WTP Kleefse Waard (Arnhem). The EDTA-containing effluent obtained from the dairy (the concentration being about 2860 mg/l H4-EDTA) was evaluated in the dilute form. The paper mill's waste water contained about 10 mg EDTA/l. Because the C:N:P ratio in this waste water impedes the proper growth of microorganisms, phosphate and urea were added in amounts of 6.2 and 100 ml/g, respectively.

The activated sludge originated from the municipal WTP of Roermond or Duiven, from Akzo Nobel's WTP in Deventer or Kleefse Waard, or from the water treatment plant of a paper mill.

Both the activated sludge and the waste water were stored at 4° C. until the time of use.

The $Na_2H_2$-EDTA was ex Akcros Chimica. The potassium hydrogen phthalate used as a standard for the analysis of (non-volatile) dissolved organic carbon (NPOC) was ex J. T. Baker. All other chemicals employed were the conventional reagents.

The pH of the waste water was set in a known manner using a phosphate or bicarbonate buffer, depending on the pH desired. In the CAS test the pH was kept at a constant level by adding caustic soda. Also, use may be made of other substances to keep the pH of the waste water within the set limits.

The NPOC value was determined in the conventional manner using a Dohrman DC-190 TOC instrument made by Rosemount Inc., Santa Clara, Calif., U.S.A., after filtration of a sample of the material to be analysed through an 8 $\mu$m cellulose nitrate filter followed by acidification.

The percentage of alkylene amine acetate removed, expressed as NPOC value, was determined from the measured NPOC values, as follows:

$$\% \text{ of material removed} = 100\ (C_T - (C_t - C_c))/C_T$$

wherein:

$C_T$=concentration of alkylene amine acetate in the waste water, expressed as NPOC value at the start of the aeration (mg/l), $C_t$=NPOC concentration of the supernatant of the treated waste water (mg/l), and Cc=NPOC concentration of the supernatant of the reference mixture (blank) after aeration (mg/l). In the CAS test the number filled in here is 0.

The EDTA content in the waste water and the treated water can also be determined by means of isocratic HPLC analysis. To this end use was made of a Lichrosphere 60 RP select B 5$\mu$ (120×4.0 mm) column ex Merck, a UV-Vis detector measuring at 260 nm, and a mobile phase consisting of 10% by volume of methanol in water containing 0.025 M of sodium acetate and 10 mM of tetrabutyl ammonium bromide. The flow rate of the filtered and degassed mobile phase brought to a pH of 4.5 with the aid of acetic acid was 0.5 ml/min.

EXAMPLE 1

Evaluation of the biodegradation of EDTA in a SCAS reactor. Using a stock solution EDTA was added to the waste water, as specified in aforementioned publication L 133. The EDTA concentration in the final waste water was 100 mg/l, which corresponds to a theoretical increase in the waste water NPOC of 35 mg/l. The waste water originated from the municipal WTP Duiven. The activated sludge used originated from the municipal WTP Roermond. During the test the pH was maintained at 8–9. The results of measurements carried out on the the supernatant of some test cycles are listed in Table 1.

TABLE 1

| Time (days) | NPOC blank (mg/l) | NPOC test solution (mg/l) | EDTA removed (%) |
|---|---|---|---|
| 1 | 14, 5 | 40, 1 | 29 |
| 4 | 14, 3 | 42, 2 | 23 |
| 7 | 11, 4 | 47, 0 | 2 |
| 10 | 13, 0 | 50, 8 | 0 |

TABLE 1-continued

| Time (days) | NPOC blank (mg/l) | NPOC test solution (mg/l) | EDTA removed (%) |
|---|---|---|---|
| 14 | 15, 4 | 44, 0 | 19 |
| 17 | 9, 0 | 47, 5 | 0 |
| 21 | 7, 2 | 37, 0 | 18 |
| 25 | 10, 0 | 31, 0 | 42 |
| 28 | 8, 9 | 8, 2 | 100 |
| 31 | 9, 2 | 17, 6 | 77 |
| 33 | 7, 7 | 7, 8 | 100 |
| 35 | 7, 9 | 7, 0 | 100 |

After 28 days the blank and the test solutions contained 180 and 208 mg nitrate/l, respectively. This means that about 65% of the EDTA-nitrogen had been converted into nitrate. The remainder of the EDTA-nitrogen had evaporated (e.g., in the form of ammonia) or been converted by the microorganisms, e.g., into new cell material. In addition, the NPOC values of the reference and test solutions show that there was no negative effect on the conversion of other waste in the waste water.

EXAMPLE 2

The experiment as described in Example 1 was repeated, except that the activated sludge from Roermond was replaced by sludge from Duiven. The results are listed in Table 2.

TABLE 2

| Time (days) | NPOC blank (mg/l) | NPOC test solution (mg/l) | EDTA removed (%) |
|---|---|---|---|
| 1 | 10, 3 | 24, 6 | 38 |
| 4 | 10, 1 | 28, 6 | 18 |
| 8 | 10, 0 | 29, 7 | 14 |
| 11 | 12, 0 | 35, 4 | 0 |
| 15 | 12, 5 | 34, 0 | 0 |
| 18 | 12, 7 | 35, 3 | 0 |
| 23 | 11, 4 | 25, 3 | 39 |
| 26 | 9, 0 | 22, 9 | 39 |
| 29 | 9, 0 | 12, 4 | 89 |
| 32 | 9, 9 | 9, 8 | 100 |
| 34 | 10, 3 | 10, 7 | 90 |

Again it was found that, after a lag period of about 4 weeks, there was effective EDTA degradation.

EXAMPLE 3

The process as described in Example 1 was repeated with waste water and activated sludge from Akzo Nobel's WTP Deventer, with the pH being maintained at 8.6–8.8. The results are listed in Table 3.

TABLE 3

| Time (days) | NPOC blank (mg/l) | NPOC test solution (mg/l) | EDTA removed (%) |
|---|---|---|---|
| 1 | 26, 1 | 45, 8 | 46 |
| 7 | 29, 0 | 59, 9 | 15 |
| 14 | 46, 7 | 76, 3 | 16 |
| 21 | 34, 1 | 89, 5 | 0 |
| 28 | 32, 5 | 101, 7 | 0 |
| 35 | 40, 5 | 72, 0 | 14 |
| 42 | 46, 1 | 82, 7 | 0 |
| 47 | 49, 0 | 62, 3 | 63 |
| 49 | 51, 7 | 49, 4 | 100 |
| 52 | 42, 4 | 30, 4 | 100 |

TABLE 3-continued

| Time (days) | NPOC blank (mg/l) | NPOC test solution (mg/l) | EDTA removed (%) |
|---|---|---|---|
| 54 | 51, 9 | 39, 0 | 100 |
| 56 | 52, 2 | 34, 3 | 100 |
| 59 | 42, 0 | 24, 3 | 100 |

It was found that the conditions employed required an incubation period of 6 weeks. After 7 weeks the SCAS reactor in which EDTA was degraded functioned more satisfactorily than the reference SCAS reactor without EDTA. Apparently, the waste water from Deventer contained too little nitrogen. As soon as EDTA degradation took place, (additional) nitrogen became available as a nutrient for the microorganisms, causing them to do better. This was confirmed by the absence of nitrate from the above solution on conclusion of the test.

EXAMPLE 4

The experiment as described in Example 1 was repeated using waste water and activated sludge from Akzo Nobel's WTP Kleefse Waard, with the pH being maintained at 8.7–8.9. The results are listed in Table 4.

TABLE 4

| Time (days) | NPOC blank (mg/l) | NPOC test solution (mg/l) | EDTA removed (%) |
|---|---|---|---|
| 1 | 22, 9 | 43, 6 | 43 |
| 7 | 23, 6 | 52, 3 | 20 |
| 14 | 25, 4 | 56, 8 | 14 |
| 21 | 18, 5 | 53, 0 | 5 |
| 29 | 17, 4 | 40, 6 | 39 |
| 35 | 15, 3 | 39, 6 | 33 |
| 42 | 17, 9 | 41, 0 | 36 |
| 49 | 18, 8 | 29, 1 | 72 |
| 52 | 19, 9 | 17, 5 | 100 |
| 54 | 26, 6 | 19, 4 | 100 |
| 56 | 20, 0 | 17, 3 | 100 |
| 59 | 19, 9 | 18, 7 | 100 |
| 60 | 24, 4 | 18, 0 | 100 |

Again, there was a clear lag period of about 6 weeks. Subsequently, there was complete EDTA degradation. In this case the nitrate content in the blank and the test solutions was 3 and 15 mg/l, respectively.

EXAMPLE 5

The process as described in Example 1 was repeated using activated sludge from a dairy's WTP, with the waste water from Duiven not being spiked with EDTA but mixed with the dairy's effluent in a ratio by volume of 95:5. The results are listed in Table 5.

TABLE 5

| Time (days) | NPOC blank (mg/l) | NPOC test solution (mg/l) | organic carbon removed (%) |
|---|---|---|---|
| 1 | 9 | 68 | 45 |
| 4 | 10 | 70 | 44 |
| 6 | 9 | 45 | 66 |
| 7 | 9 | 39 | 72 |
| 10 | 11 | 15 | 96 |
| 11 | 9 | 17 | 93 |
| 12 | 9 | 17 | 93 |
| 14 | 8 | 12 | 96 |

TABLE 5-continued

| Time (days) | NPOC blank (mg/l) | NPOC test solution (mg/l) | organic carbon removed (%) |
|---|---|---|---|
| 17 | 10 | 25 | 86 |
| 19 | 10 | 16 | 94 |
| 21 | 9 | 12 | 97 |
| 25 | 9 | 12 | 97 |
| 28 | 9 | 17 | 93 |
| 32 | 10 | 16 | 94 |

During the first week 40–75% of the organic carbon was removed from the waste water. It is likely that the non-EDTA-carbon was degraded. After this period the EDTA-carbon was also removed. This was confirmed by an HPLC measurement on the supernatant of the cycle of day 28, which showed 98% removal of EDTA. In other words, virtually all EDTA was biodegraded after a lag period of 10 days.

EXAMPLES 6–10

To sludge from a paper mill enriched as specified in Example 1 to give effective EDTA biodegradation waste water from the same paper mill was added in a CAS test. This EDTA-containing waste water had an original pH of 4, an EDTA content of 10.0 mg/l, and an NPOC value of 270 mg/l.

The temperature during the CAS test ranged from 20° to 22° C. NaOH was used to keep the pH in the CAS reactor in Examples 6–10 at 7.5, 8.0, 8.5, 9.0, and 9.5, respectively.

After 10 days a stable situation was achieved. As the table below shows, at a pH of 8.5 and 9.0 there was efficient biodegradation not only of other organic carbonaceous substances but also of EDTA.

TABLE 6

| Example | pH | NPOC removed (%) | EDTA removed (%) |
|---|---|---|---|
| 6 | 7, 5 | 86 | 34 |
| 7 | 8, 0 | 83 | 59 |
| 8 | 8, 5 | 86 | 82 |
| 9 | 9, 0 | 84 | 82 |
| 10 | 9, 5 | 83 | 61 |

EXAMPLE 11

The experiment as described in Example 2 was repeated, except that this time instead of EDTA, PDTA was added to the waste water. The quantity of PDTA added corresponded to a theoretical increase in the NPOC value by 23.4 mg/l. After a lag time of about 60 days biodegradation of PDTA was observed. After about 200 days there was efficient microbiological degradation of PDTA, as is shown by the following table.

TABLE 7

| Time (days) | NPOC blank (mg/l) | NPOC test solution (mg/l) | PDTA removed (%) |
|---|---|---|---|
| 7 | 10, 1 | 32, 2 | 0 |
| 21 | 9, 7 | 33, 1 | 0 |
| 42 | 10, 4 | 24, 7 | 39 |
| 54 | 9, 4 | 34, 2 | 0 |
| 68 | 9, 1 | 29, 8 | 11 |
| 82 | 10, 9 | 30, 5 | 17 |
| 96 | 10, 9 | 26, 1 | 35 |
| 110 | 12, 9 | 30, 1 | 17 |
| 124 | 10, 7 | 25, 6 | 36 |
| 138 | 14, 2 | 25, 6 | 36 |
| 152 | 9, 7 | 13, 3 | 85 |
| 166 | 11, 3 | 17, 8 | 72 |
| 180 | 10, 3 | 18, 3 | 66 |
| 187 | 11, 4 | 22, 1 | 59 |
| 199 | 10, 5 | 11, 7 | 95 |
| 201 | 10, 5 | 15, 4 | 79 |
| 203 | 10, 0 | 12, 8 | 88 |

We claim:

1. A process for the microbiological degradation of alkylene amine acetates under alkaline conditions using microorganisms present in activated sludge, said process comprising contacting alkylene amine acetate-containing waste, at a pH about 9 or less, with activated sludge containing a wide range of microorganisms, in the absence of carrier materials.

2. The process of claim 1 wherein the waste is contacted with the activated sludge at a pH in the range of 8.5 to 9.0.

3. The process of claim 1 wherein the alkylene amine acetate subject to microbiological degradation is EDTA or PDTA.

4. The process of claim 1 wherein the microbiological degradation is carried out in a waste water treatment plant.

5. The process of claim 3 wherein the activated sludge used for the degradation of EDTA has a retention time in the plant of at least one week.

6. The process of claim 3 wherein the activated sludge used for the degradation of PDTA has a retention time in the plant of at least two months.

7. The process of claim 1 wherein the pH is kept below 9 during degradation.

8. The process of claim 1 wherein alkylene amine acetate degrading microorganisms are added to the activated sludge prior to or in the course of an alkylene amine acetate-containing effluent stream being contacted with the activated sludge.

* * * * *